United States Patent

[11] 3,610,760

| [72] | Inventor | Ralph Martin Lowe<br>Hawthorn, Victoria, Australia |
|---|---|---|
| [21] | Appl. No. | 821,007 |
| [22] | Filed | May 1, 1969 |
| [45] | Patented | Oct. 5, 1971 |
| [73] | Assignee | Commonwealth Scientific and Industrial Research Organization<br>East Melbourne, Victoria, Australia |
| [32] | Priority | May 1, 1968 |
| [33] | | Australia |
| [31] | | 37,185 |

[54] METHOD AND APPARATUS FOR SELECTIVELY MODULATING RESONANCE LINES EMITTED BY AN ATOMIC SPECTRAL LAMP AND DETECTION THEREOF
10 Claims, 5 Drawing Figs.

[52] U.S. Cl. .................................................. 356/87, 250/218, 313/209, 356/97, 356/201
[51] Int. Cl. ........................................................ G01j 3/42
[50] Field of Search .......................................... 356/85–87; 313/209; 250/218

[56] References Cited
UNITED STATES PATENTS
3,433,963  3/1969  Walsh et al. ................. 250/218 X
OTHER REFERENCES
Dawson et al. " Pulsed Current Operation of Hollow Cathode Lamps to Increase the Intensity of Resonance Lines for Atomic Absorption Spectroscopy," Spectrochimica Acta, vol. 23A March 1967, pages 565— 569

*Primary Examiner*—Ronald L. Wibert
*Assistant Examiner*—F. L. Evans
*Attorney*—Sughrue, Rothwell, Mion, Zinn and Macpeak ABSTRACT: A method and apparatus for determining absorbance of a sample medium by using an atomic spectral lamp which uses a discharge to sputter an electrode to produce atomic vapor and also to excite that vapor to produce spectral radiation which is passed via a sample to a photodetector the new method involving pulsing of the discharge so that radiation emitted in the absence of a pulse passes through vapor left by the preceding pulse and the resonance lines in the radiation are thereby absorbed by the vapor, and the apparatus including detector circuitry controlled to select the component of the photodetector output which is modulated by reason of the absorption of the resonance lines.

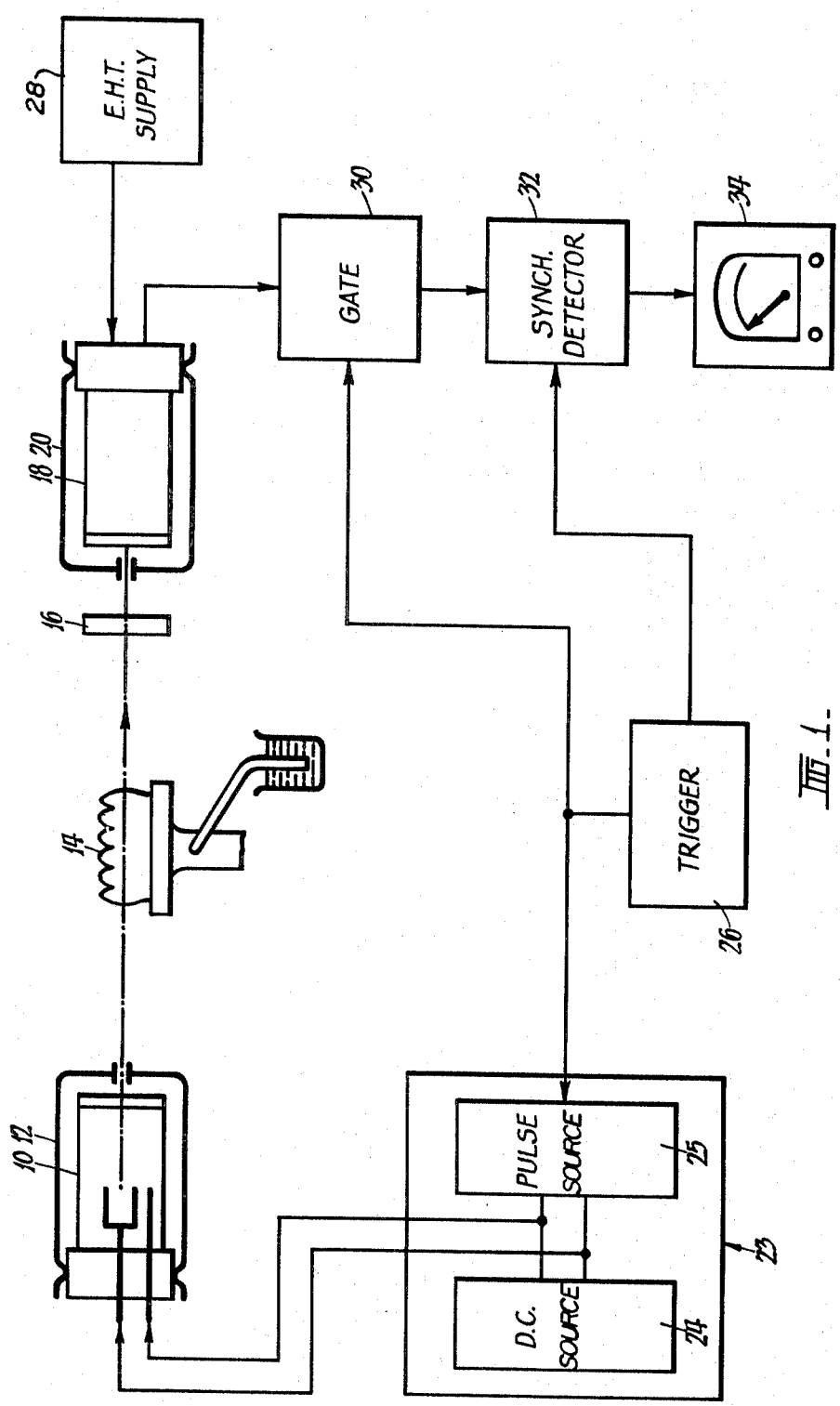

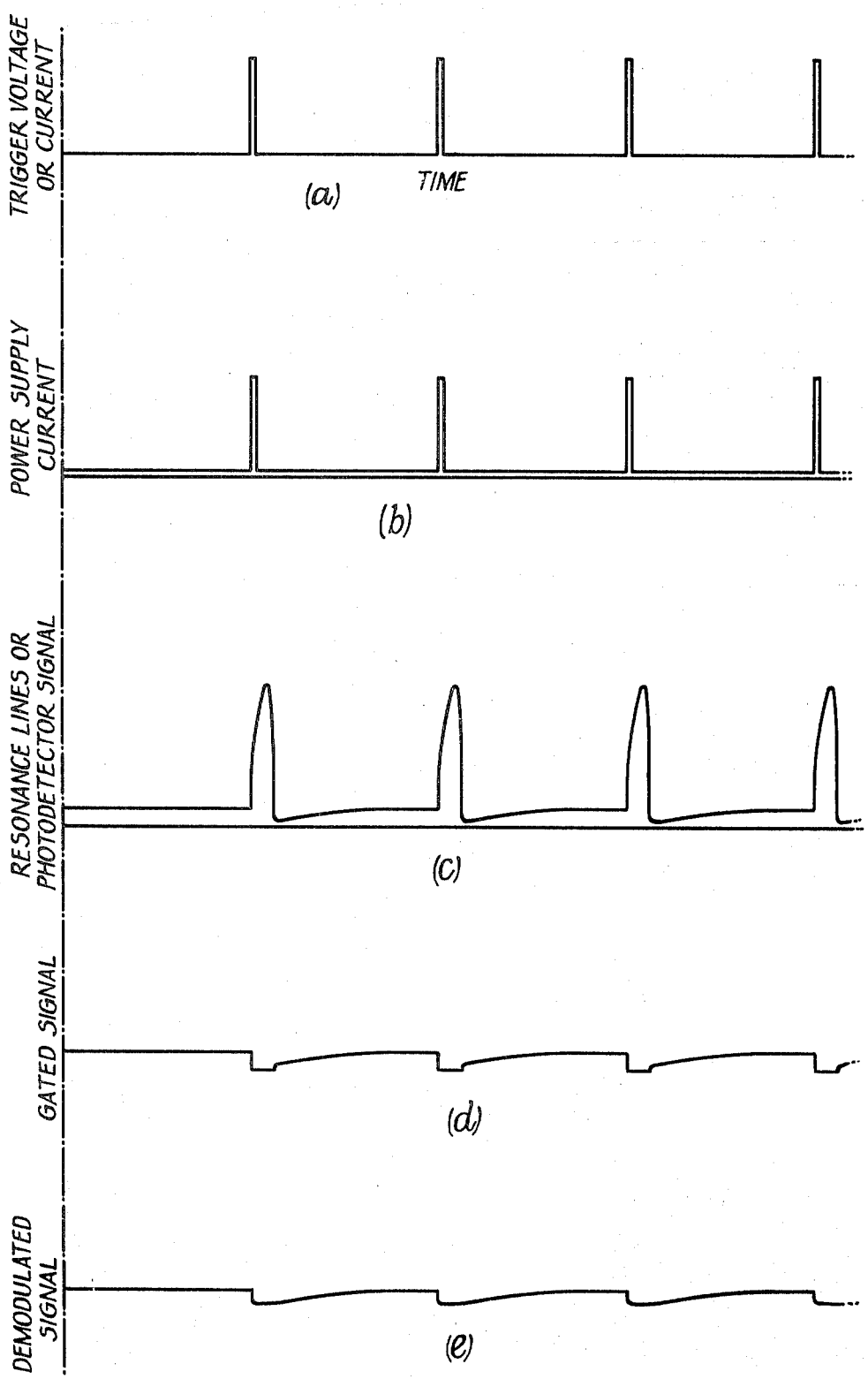

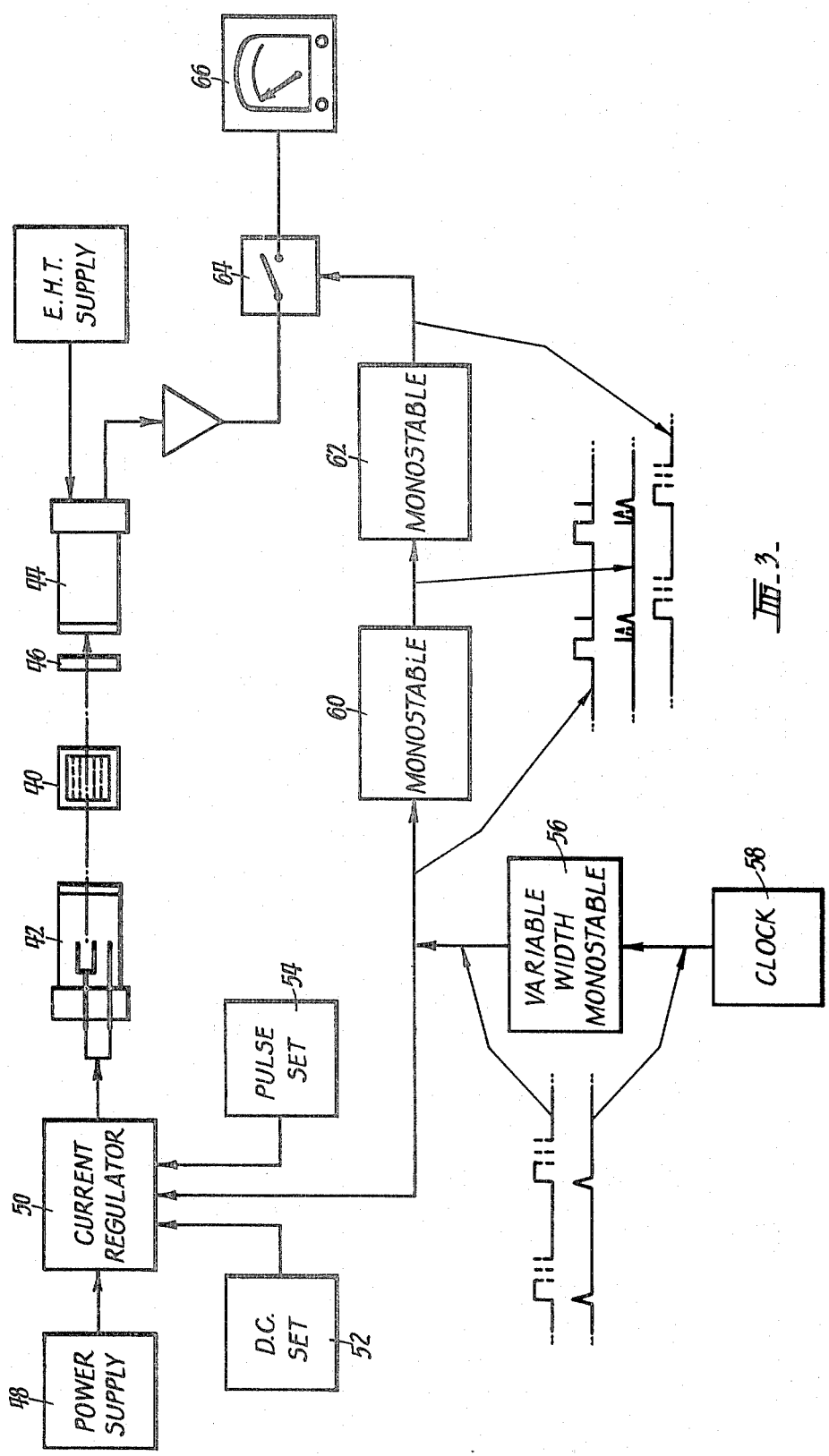

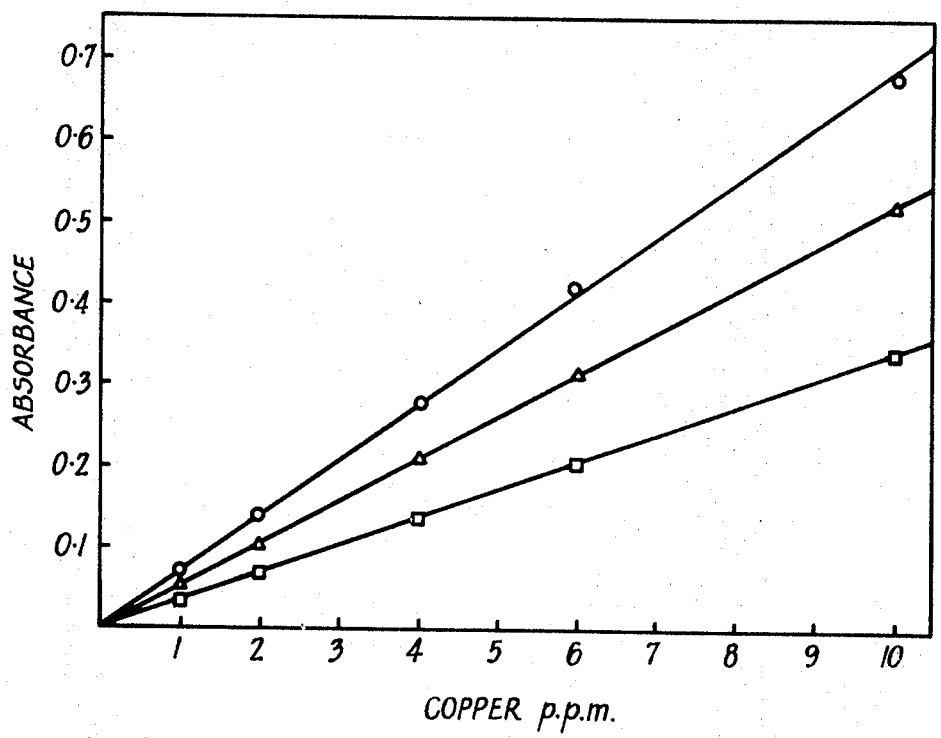
o 3247°A ABSORPTION BY CONVENTIONAL MONOCHROMATOR.
□ 3274°A ABSORPTION BY CONVENTIONAL MONOCHROMATOR.
△ SELECTIVE MODULATION OF HOLLOW CATHODE LAMP - UG2 FILTER.
Fig_4_

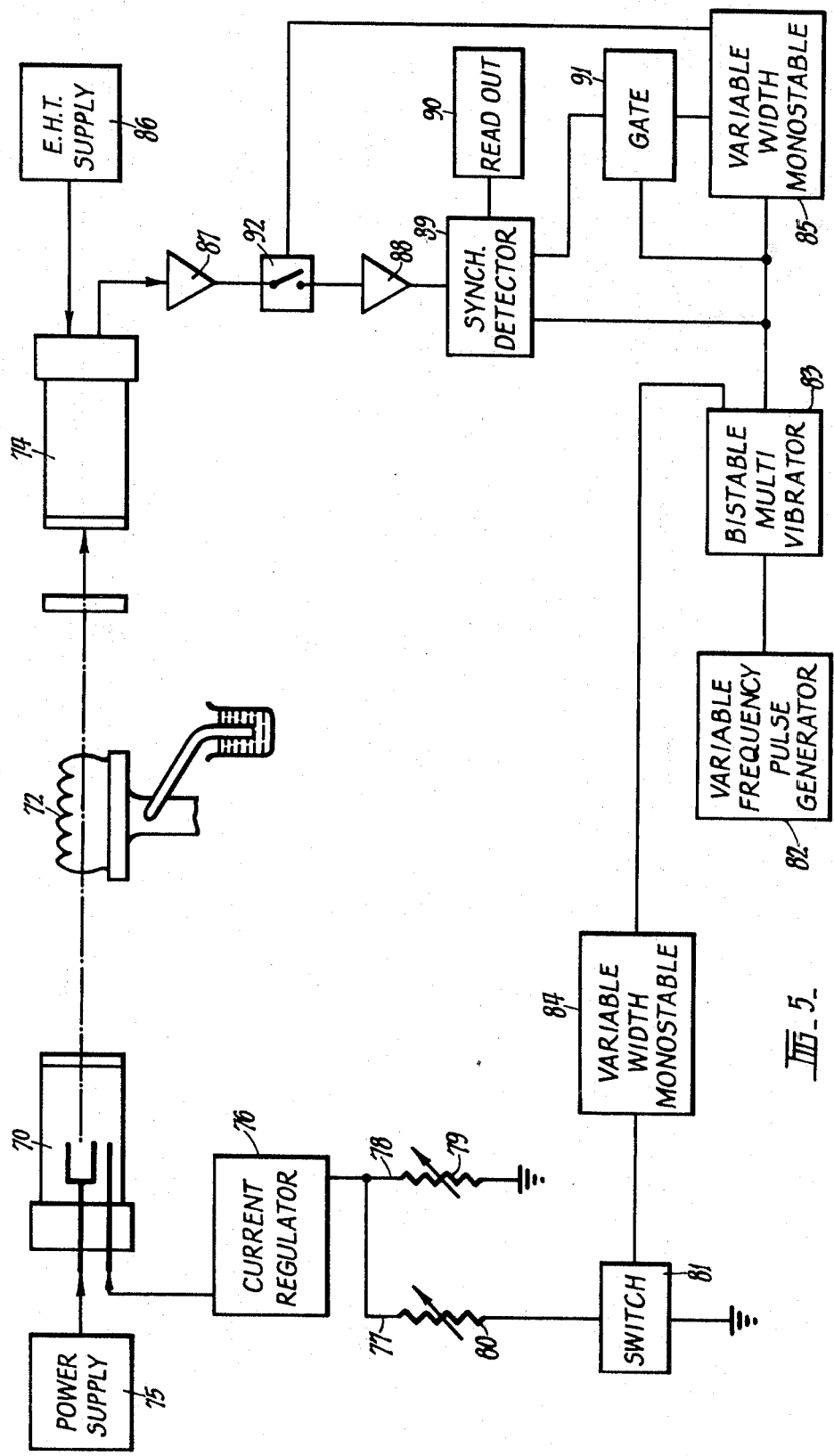

METHOD AND APPARATUS FOR SELECTIVELY MODULATING RESONANCE LINES EMITTED BY AN ATOMIC SPECTRAL LAMP AND DETECTION THEREOF

This invention lies in the field of atomic absorption spectroscopy and seeks to provide further simplification and improvement of analytical techniques currently employed in this field. Although the present invention is particularly concerned with techniques where the sample to be analyzed is converted into atomic vapor by means of an atomizing flame, the same principles are applicable to other sample media, such as gases, atomic vapors produced by sputtering, or thermally or in ways other than by the use of atomizing flames, and such as liquid or solid media employed in colorimetric measurements.

While the basic atomic absorption technique, as described in our Australian Pat. No. 163,586, has important, fundamental and quite general advantages over emission spectroscopy, the need to intensity-modulate the atomic spectral radiation to discriminate against flame emission or background radiation, and the need to employ a continuously variable monochromator to select and isolate the desired spectral line for absorbance measurement, meant that the equipment cost was substantial. Subsequently, and as described in our Australian Pat. No. 263,927, it was proposed to replace the complex monochromator with a "resonance lamp" which would re-emit only the resonance lines contained in the incident atomic spectral radiation. In another technique, the resonance lines in the radiation were selectively modulated by interposing a "selective modulator lamp" in which a pulsating cloud of the atomic vapor concerned was generated (see our Australian Pat. No. 263,928). While each of these improvements enhanced analytical atomic absorption techniques, the need to employ a set of lamps an atomic spectral lamp, a resonance lamp, and/or a selective modulator lamp—for each element to be analyzed was undesirable, even though the need for a conventional monochramator was eliminated.

Accordingly, we seek to provide by the present invention an atomic absorption technique and apparatus which will enable the conventional monochramator to be eliminated without making it necessary to substitute other spectral "lamps" in its place. It will be appreciated, however, that the technique of the invention is substantially independent of the use of the above mentioned "lamps" or monochramators so that, if desired, they may be used in conjunction with the techniques of the present invention for particular purposes.

The present invention employs an atomic spectral lamp of the type comprising a pair of electrodes at least one of which contains or consists of a certain chemical element, a discharge being struck between the electrodes when the lamp is in use so that an atomic vapor of the element is produced and passage of the discharge through the vapor excites it so that spectral radiation, including resonance lines characteristic of the element, is emitted. A lamp of this type will be referred to hereinafter as a "lamp" of the type described. In the present invention, such a lamp is preferably of the hollow cathode type.

The present invention provides a method of selectively modulating resonance lines emitted by an atomic spectral lamp of the type described comprising the step of varying the current flow in the discharge between a relatively low level and a relatively high level so that radiation generated during a period of relatively low discharge current passes through residual atomic vapor left by the preceding period of relatively high discharge current whereby resonance lines emitted during said period of relatively low discharge current are at least partially absorbed by said vapor.

Since the discharge is itself varying, overall intensity modulation is provided so that discrimination against background radiation is possible; and, since the radiation emitted during the periods when the discharge current is low passes through the rapidly decaying residual vapor left by the higher discharge currents, the resonance lines of that radiation will be selectively modulated so that discrimination against non-resonance lines is possible.

The above method of operating an atomic spectral lamp may be used in the determination of the absorbance of a sample medium by causing the radiation from the lamp to impinge on the sample medium and using a photodetector to measure radiation transmitted through the medium or reflected from it. In such a case, the determination is made by reference to resonance radiation received by the photodetector during periods of relatively low discharge current.

The invention is also concerned with apparatus for performing the above method, such apparatus including means for supplying a pulsating current to an atomic spectral lamp of the type described, and sensing means including a photodetector arranged to receive the radiation and produce an electric output signal, the sensing means being capable of selecting from radiation received by the photodetector a component representing resonance radiation received during periods of relatively low discharge current. According to a preferred feature, the selection is made by selective blocking of the photodetector output.

FIG. 1 is a block diagram showing the main components of the system.

FIG. 2 is a collection of graphs showing how the signals at various points in the diagram of FIG. 1 vary with time.

FIG. 3 is a block circuit diagram of a modified system like that of FIG. 1.

FIG. 4 is a graph providing comparative calibration curves for the determination of copper when using conventional techniques and those of the present invention.

FIG. 5 is a block diagram showing a further modified system.

Referring particularly to FIG. 1 of the accompanying drawings, a commercial hollow cathode atomic spectral lamp 10 is housed within a shroud 12 so that its output radiation is directed in turn through a conventional atomizing flame 14, a conventional absorption filter 16, and onto the first dynode of a conventional photomultiplier tube 18 housed within a shroud 20. The current for the hollow cathode discharge in lamp 10 is supplied from the power supply 23 which consists of a DC source 24 connected in parallel with a pulse source 25. The timing of the current pulses delivered by the pulsed source 25 is controlled by the means of a trigger circuit 26. The photomultiplier tube 18 is serviced by a standard extra high tension supply 28, while its output signal is passed in succession through a gating circuit 30, a synchronous detector 32 and an output or indicator circuit 34, the gating circuit and the synchronous detector being connected to and controlled by the trigger circuit 26.

In operation, the hollow cathode discharge is initiated and maintained at a steady level by means of the DC power supply 24. The trigger circuit 26 is then switched on so as to operate the pulsed power supply 25, the gate 30 and the synchronous detector 32. The flame 14 is then ignited and the sample solution 36 is sprayed into the flame in the conventional way.

Referring now particularly to FIG. 2 of the accompanying drawings, curve $a$ shows the output of the trigger circuit 26 while curve $b$ depicts the output of the combined power supply circuit 23; and it will be noticed that the pulses from the pulsed supply 25 are superimposed upon the steady current provided by the DC supply 24.

The total radiation emitted by the atomic spectral lamp 10 varies substantially as the current supplied to the lamp, but the variation in the intensity of the resonance lines emitted by lamp 10 departs in a significant way from the variation of the current supplied to the lamp, as shown by the difference between curves $b$ and $c$ of FIG. 2. Each current pulse supplied to the lamp generates a corresponding puff or pulse of vapor within the lamp in front of the hollow cathode and, upon the termination of the current pulse, this vapor strongly absorbs any resonance line emitted by the base level discharge. However, as the vapor disperses in the lamp the intensity of the resonance line returns to its base level. Curve $c$ therefore represents approximately the output signal from the photomultiplier. It will be noted that due to after glow effects, the increase in radiation caused by the current pulse is "elongated," that is, lasts significantly longer than the current pulse itself.

Gate 30 receives signal c and also output a of the trigger 26 and is operated so as to block the photomultiplier signal during the time for which the radiation level is substantially increased. The output of gate 30 is therefore represented by curve d. Trigger circuit 26 provides a second output, however, which is applied to synchronous detector 32 to cause the detector to accept signals only while gate 30 is open. The detector assists in elimination of background noise which has not been indicated on the signal from gate 30. As a result, the output of synchronous detector 32 is as depicted by curve e of FIG. 2 and can be applied directly to the output or indicator circuit 34 which, in effect, measures the peak or average voltage of the signal e.

The magnitude of each pulse to the lamp 10 is substantially greater than the base level of the direct current supply to the lamp so that sufficient vapor is produced in the lamp to absorb substantially all of any resonance line immediately upon the termination of each pulse. This has the effect of lowering the minimum level of signals c, d and e as far as possible below the base line DC levels so as to give the greatest possible depth of modulation of output signals e.

The AC component of final signal e is due only to the effect of the decaying vapor cloud on the resonance lines so that the voltage measured by circuit 34 is a measure of the intensity of the resonance lines falling on photomultiplier tube 18. In the absence of any of the sample within flame 14, or in the absence of any of the "test element" in the sample, the signal indicated is a maximum and indicates zero absorbance. When a sample containing the test element is introduced into the flame, absorption of resonance radiation occurs and the indicated signal is reduced. The amount of reduction of signal is a measure of the amount of the test element in the sample.

The system of FIG. 3 is similar in its basic features to that of FIG. 1 but, in place of the atomizing flame a transparent sample cell 40 containing a liquid or gaseous sample medium is interposed between the spectral lamp 42 and the photomultiplier 44, an absorption or interference filter 46 being used as before. However, the circuitry associated with this embodiment differs somewhat from that of FIG. 1 in that the hollow cathode lamp 42 is supplied with both the DC and the pulse components of its current from its power supply 48 through a current regulator and power switch 50. The level of the DC current is set by control 52 and the level of the pulse current is set by control 54. The duration of each current pulse is determined by a variable-width monostable multivibrator 56, while the timing of each pulse is controlled by a variable frequency trigger two generator 58, which acts as a master clock for the system. In order to allow a controlled period between the termination of the discharge pulse and the commencement of detection so as to allow the vapor after-glow to subside, two monostable multivibrator circuits 60 and 62 are operated from the pulse controlling circuit 56. Monostable 60 is adapted to be triggered by the start of each output pulse from circuit 56 and provides an output trigger pulse at a controlled time after its activation. The output from variable monostable 60 then initiates the operation of variable monostable 62 so that its output is a variable width 'detection pulse' which is generated at a controlled time after the start of the discharge pulse.

The detection pulse may be used to control a variety of detector and discriminator circuits, but that illustrated in FIG. 3 is a sample gate 64 which is 'closed' to connect the amplified photodetector signal to the output circuit 66 during each detection pulse and 'opened' to disconnect the photodetector from the output circuit. Thus, the signal as seen by the output circuit is a train of pulses, the height of which vary according to the degree of absorbance by the sample medium.

It has been found that, for argon filled copper hollow cathode lamps (as supplied by Atomic Spectral Lamps Pty. Ltd., Melbourne, Australia) a pulse of 50 $\mu$sec. duration with a peak height of around 300 ma. produces sufficient vapor for the modulation process. The decay time of this vapor cloud is about 60 ms. and thus by repeating the pulse at 15 Hz. it is possible to obtain a clear separation of the two components of the output signal; namely, the short duration and intense signal due to the increased excitation of all spectral lines, and the much longer signal due to the modulation of the resonance lines by the decay of the vapor cloud. Although in this example the discharge pulse is only 50 $\mu$sec. long, it was found to be desirable to delay the start of the detection pulse for about 1 ms. so as to allow emission from the vapor cloud in the lamp to subside adequately.

It was found that, by running the lamps at about 20 ma. DC there was sufficient signal to allow one to let the output from the hollow cathode lamp fall directly onto the photomultiplier without the use of a monochromator, and still have tolerable signal to noise levels. Subsequent improvement of the system has enabled reduction of the running level to about 10 ma. DC, however, the improved system being described with reference to FIG. 5.

FIG. 4 shows the calibration curve obtained in the above example in comparison with those obtained by the conventional atomic absorption technique using a monochromator. The calibration curve obtained using selective modulation was found to coincide almost exactly with that expected from a calculation of the result of mixing the two resonance lines in the proportions that they are transmitted by the filter. This demonstrates that the resonance lines have been uniquely isolated by the selective modulation technique employed. (The filter employed here was the standard "UG2").

FIG. 5 illustrates a further embodiment of the invention comprising a hollow cathode lamp 70, an atomizing flame 72 and a photomultiplier 74 arranged to receive radiation passing from the lamp through the flame. The lamp in this case is connected in series with a power supply 75, a current regulator 76 and a pair of lines 77, 78 which pass from regulator 76 to earth. Line 77 contains a variable resistor 79 connected between the current regulator 76 and earth, and through this regulator flows the base level DC supplied to the lamp. Line 78 also contains a variable resistor 80 which is connected to earth via a switch 81.

Operation of the lamp is controlled indirectly by a variable frequency pulse generator 82 which acts as a master clock similar to clock 58. Clock 82 feeds pulses to a bistable multivibrator 83 which in response feeds signals to monostable multivibrators 84 and 85, each of which can produce pulses of varying width. Vibrator 84 is connected to switch 81 so as to control operation of the switch. Closing of switch 81 in response to pulses of clock 82 increases the voltage appearing across the electrodes of lamp 70 and hence increases the current in the discharge. The time for which switch 81 is closed depends upon the width of the pulse produced by vibrator 84.

The photomultiplier is fed from a normal EHT supply 86 and its output is fed via two stages of amplification 87, 88 to a synchronous detector 89. The output detector 89 is fed to a readout device 90 such as a meter. The signal fed by vibrator 83 to vibrator 85 is passed also to detector 89 and to an "AND" gate 91. The output of vibrator 85 is also fed as an input to gate 91, the output of which is fed to detector 89. Detector 89 is blocked by receipt of signals from both of vibrators 83 and 85, the period for which the detector is blocked being determined by the width of the pulse produced by vibrator 85. This ensures that the detector is blocked for a predetermined period after initiation of a discharge pulse in the lamp. Hence the after-glow effect has died down in the lamp before the synchronous detector will accept an output signal from the photomultiplier. To avoid swamping of the main amplifier stage 88 by the after-glow, a gating switch 92 is connected between amplification stages 87, 88 and is controlled by vibrator 85 so that the gate is open for the same period as the detector is blocked.

While particular forms of the invention have been described in detail, it should be understood that it is anticipated that those skilled in the art will be able to make many modifications and additions thereto without departing from the scope of the invention. For example, either the gate of the synchronous detector may be omitted from the system of FIG. 1 and much of the elaboration of FIG. 3 can be omitted. It is most desirable to use a photomultiplier having peak sensitivity in the ultraviolet region of the spectrum when working with most metals since the dominant resonance lines of these elements happen to be in this region of the spectrum. A simple broad band absorption or interference filter can be used with such a photomultiplier.

The apparatus in the drawings has been described as operating with a base level DC current in the region of 10 ma. or 20 ma. However, the apparatus is operable with base level currents as low as 5 ma., and the lamp may be operated up to the limit at which damage is caused to the electrodes. Lamps at present in production are preferably operated in the 5 ma. to 20 ma. region.

The pulse repetition frequency mentioned above is 15 Hz. but this can be varied as desired. Higher pulse repetition frequencies reduce the signal level by allowing insufficient time for the vapor to decay completely, and slower repetition frequencies cause incomplete modulation of the output signal.

The peak pulse current is related to the pulse duration, the higher the pulse current, the shorter being the pulse duration required. Peak pulse currents in the range 100 ma. to 800 ma. are usable, and pulse durations of 10 ms. to 100 ms. are also allowable. The preferred range for the pulse duration is however 10 ms. to 50 ms.

The specific illustrated embodiments all use blocking of the photodetector output to select the component of resonance radiation received by the photodetector during the low discharge current periods. This is the most convenient method of obtaining the desired result, but alternative methods are possible, for instance, the photodetector power supply may be switched so as to render the photodetector ineffective for predetermined periods, or the indicator may be controlled to prevent registration of selected portions of the photodetector output signal.

I claim:

1. A method of producing and detecting a selectively modulated resonance line in radiation emitted by an atomic spectral lamp of the type comprising a pair of electrodes at least one of which contains or consists of a certain chemical element and which produces a discharge to sputter said at least one electrode produce an atomic vapor of said element, passage of the discharge through the vapor excites it to cause emission of said radiation including said resonance line which is characteristic of said element, comprising the steps of;

supplying to the discharge a periodically varying current, each period comprising a first portion of relatively high current and a second portion of relatively low and substantially constant current such that radiation emitted during each said second portion passes through dissipating atomic vapor produced during the preceding portion of relatively high current, the resonance line being absorbed to a degree dependent upon the density of the atomic vapor through which it passes, each said second portion being of such duration, and the relatively high current being so related to the relatively low current, that during said second portion there is a detectable variation in intensity of the resonance line due to the dissipation of atomic vapor, causing the emitted radiation to impinge on detection means responsive to said variation in intensity of the resonance line, and rendering said detection means ineffective during each of said first portions.

2. A method as claimed in claim 1 including the steps of causing said emitted radiation to impinge on photodetector means arranged to produce an output signal in response thereto for transfer to indicator means responsive to the output signal, and rendering the detection means ineffective by preventing transfer of said signal to the indicator means during each of said first portions.

3. A method as claimed in claim 2 including the steps of transferring said signal to the indicator means by way of a synchronous detector and synchronizing the detector with the variation of current flow in the discharge so as to selectively prevent transfer of the signal.

4. A method of measuring concentration of a particular element in a sample employing a method as claimed in claim 1 and comprising the steps of selecting the lamp such that the resonance line is characteristic of the particular element, positioning the sample between the lamp and the detection means so that if the sample contains the particular element it can absorb the resonance line from the radiation emitted by the lamp to a degree dependent upon the concentration of the particular element in the sample, and using said detection means to measure the degree of absorption of said resonance line by said sample.

5. Apparatus for producing and detecting a selectively modulated resonance line comprising;

an atomic spectral lamp of the type comprising a pair of electrodes at least one of which contains or consists of a certain chemical element and which produces a discharge to sputter said at least one electrode to produce an atomic vapor of said element, passage of the discharge through the vapor excites it to cause emission or radiation including said resonance line which is characteristic of said element, current supply means for supplying to the discharge a periodically varying current, each period comprising a first portion of relatively high current and a second portion of relatively low and substantially constant current such that radiation emitted during each said second portion passes through dissipating atomic vapor produced during the preceding portion of relatively high current, the resonance line thereby being absorbed to a degree dependent upon the density of the atomic vapor through which it passes, each said second portion being of such duration, and the relatively high current being so related to the relatively low current, that during said second portion there is a detectable variation in intensity of the resonance line due to dissipation of atomic vapor produced during the first portion, detection means responsive to said variation in intensity of the resonance line and arranged to receive radiation emitted by the lamp, and means for rendering said detection means ineffective during each of said first portions.

6. Apparatus as claimed in claim 5 wherein the detection means comprises photodetector means arranged to produce an output signal in response to radiation received thereby and indicator means arranged to receive the output signal from the photodetector means, the means to render said detection means ineffective comprising means selectively operable to prevent transfer of said output signal to the indicator means during each of said first portions.

7. Apparatus as claimed in claim 6 wherein said means to prevent transfer of the output signal comprises a synchronous detector and means to synchronize said detector with the current supplied to the lamp.

8. Apparatus for use in measuring concentration of a particular element in a sample comprising apparatus as claimed in claim 5 the lamp being such that the resonance line is characteristic of said particular element, means being provided to enable location of the sample between the lamp and the detection means so that if the sample contains the particular element it can absorb the resonance line from the radiation emitted by the lamp to a degree dependent upon the concentration of the particular element in the sample, and said detection means being arranged to enable measurement of the degree of absorption of said resonance line by said sample.

9. Apparatus as claimed in claim 8 wherein the means enabling location of the sample comprises means for producing a flame between the lamp and the detection means and means for introducing the sample into the flame so that an atomic vapor of the sample is produced in the flame.

10. Apparatus as claimed in claim 6 wherein the photodetector means comprises a photomultiplier having maximum sensitivity to radiation near the ultraviolet region of the electromagnetic spectrum.